United States Patent [19]

Lewis et al.

[11] Patent Number: 4,551,731

[45] Date of Patent: Nov. 5, 1985

[54] INK JET PRINTING APPARATUS CORRECTIONAL IN DROP PLACEMENT ERRORS

[75] Inventors: John D. Lewis, Cambridge; Michael R. Keeling, Willingham; David R. Bowen, Bar Hill; Anthony D. Paton, Long Stanton, all of England

[73] Assignee: Cambridge Consultants Limited, Cambridge, England

[21] Appl. No.: 521,169

[22] Filed: Aug. 8, 1983

Related U.S. Application Data

[63] Continuation of Ser. No. 246,221, Mar. 23, 1981, abandoned.

[30] Foreign Application Priority Data

Mar. 26, 1980 [GB] United Kingdom ................. 8010105

[51] Int. Cl.[4] ............................................ G01D 15/18

[52] U.S. Cl. ........................................................ 346/75

[58] Field of Search .............................. 346/75, 140 R

[56] References Cited

U.S. PATENT DOCUMENTS

| | | | |
|---|---|---|---|
| 3,911,818 | 10/1975 | MacIlvaine | 101/426 |
| 4,067,019 | 1/1978 | Fleischer et al. | 346/75 |
| 4,121,223 | 10/1978 | Omori et al. | 346/75 |
| 4,122,458 | 10/1978 | Paranjpe | 346/75 |
| 4,238,804 | 12/1980 | Warren | 346/75 |
| 4,255,754 | 3/1981 | Crean et al. | 346/75 |
| 4,288,797 | 9/1981 | Horine et al. | 346/75 |
| 4,333,083 | 6/1982 | Aldridge | 346/1.1 |
| 4,371,878 | 2/1983 | Jinnai | 346/75 |
| 4,395,717 | 7/1983 | Horine et al. | 346/75 |

FOREIGN PATENT DOCUMENTS

| | | |
|---|---|---|
| 2611282 | 9/1976 | Fed. Rep. of Germany . |
| 2759067 | 7/1978 | Fed. Rep. of Germany . |
| 1354890 | 5/1974 | United Kingdom . |
| 1432366 | 4/1976 | United Kingdom . |

OTHER PUBLICATIONS

IBM Technical Disclosure Bulletin, vol. 21, No. 5, Oct. 1978: Ink Sensor Contamination Avoidance; J. T. Welch.

*Primary Examiner*—E. A. Goldberg
*Assistant Examiner*—Gerald E. Preston
*Attorney, Agent, or Firm*—Browdy and Neimark

[57] ABSTRACT

An ink jet array printer has at least one row of printing guns. The guns deposit drops which are charged and deflected for printing on a printing surface moving relatively to the printer in line sections which together form a transverse printing line. The charging of the drops is effected by applying to the charge electrode of each gun, under the control of printing information, a periodic voltage waveform of sufficient period to span a raster of successively formed drops which are employed for printing the corresponding line section, the printing lines being successively formed at the frequency of the voltage waveform. Detector means are provided which sense values representative of drop placement errors of jets of test drops in the direction of relative movement of the printer and printing surface and control means responsive to the sensed values are operative to advance or retard the application to the charge electrode of each printing gun of the periodic voltage waveform thereby to correct for said drop placement errors.

11 Claims, 12 Drawing Figures

Figure 1:
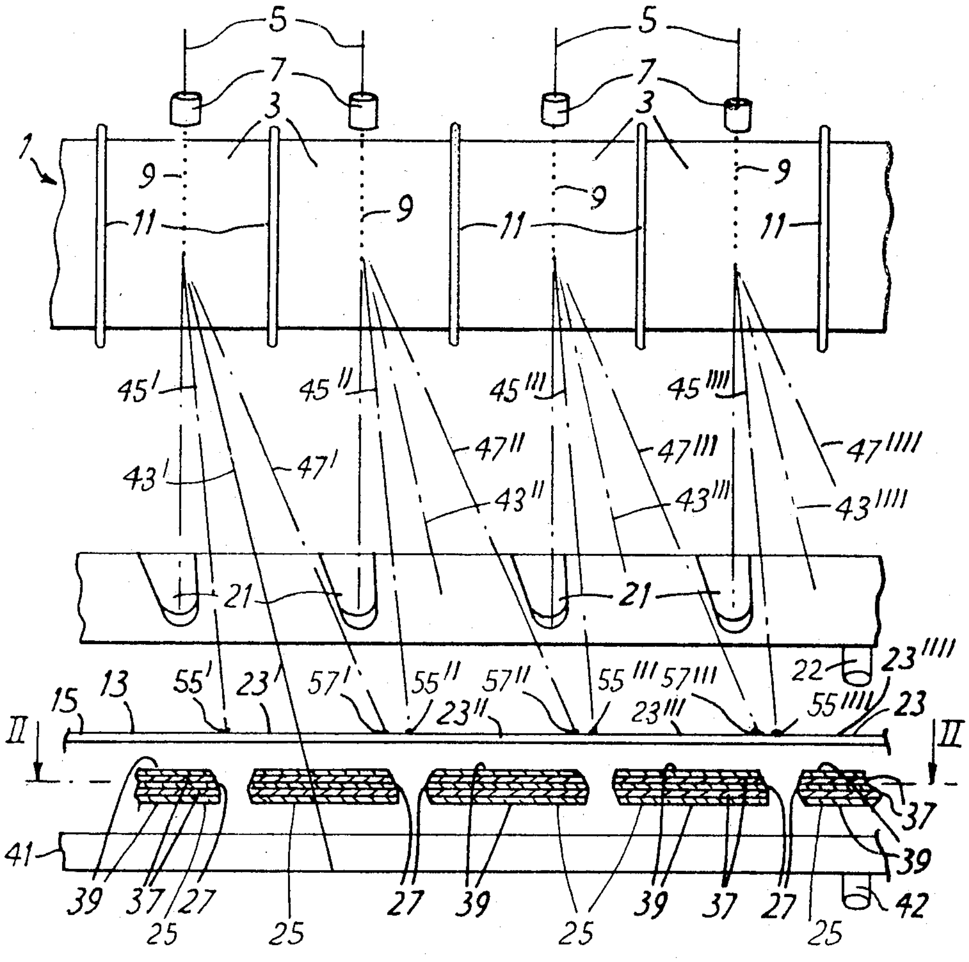

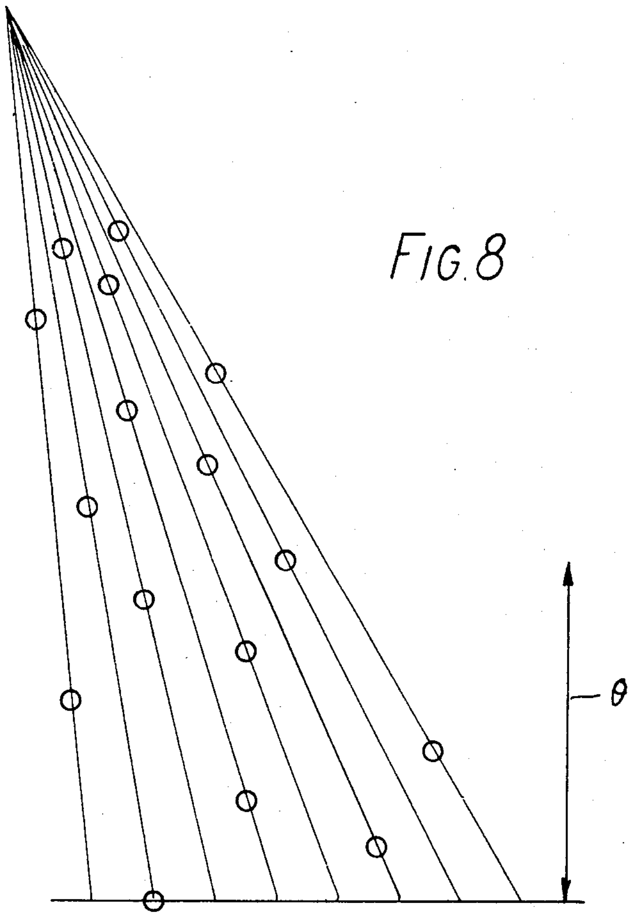
FIG. 8
FIG. 9
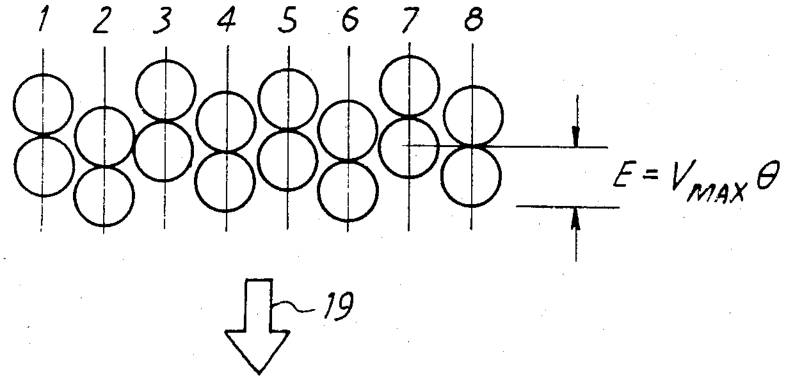

INK JET PRINTING APPARATUS CORRECTIONAL IN DROP PLACEMENT ERRORS

This application is a continuation of application Ser. No. 246,221, filed Mar. 3, 1981 now abandoned.

This invention relates to ink jet printers and more particularly to ink jet array printers. The term "ink" as used hereinafter is intended to embrace other printing liquids, such as liquid dyes, as well as liquid ink.

Ink jet array printers employing one or more rows of ink jet printing guns and serving as pattern printers are described, for example, in United Kingdom specifications Nos. 1354890 and 1432366 though when employing one row only of ink jet printing guns, they may be used for character or facsimile printing.

The ink jet printer described in the specifications referred to is adapted to print by depositing small drops of ink in accordance with printing information on a surface to be printed during continuous movement relatively to the apparatus of the surface, and comprises one or more rows of ink jet printing guns, each gun having means for supplying printing ink under pressure to an orifice, means for forming regularly spaced drops in the ink stream issuing from the orifice, charge electrode means for charging the drops, means for applying to the charge electrode means, under the control of the printing information, a periodic voltage waveform whose period is sufficient to span the formation of a series, hereinafter referred to as a "raster" of consecutively formed drops, and whose amplitude is dependent on said printing information, drop deflection means for providing normal to the direction of relative movement of the apparatus and the printing surface, a substantially constant electrostatic field through which the drops pass towards the printing surface thereby to deflect electrically charged drops transversely to said direction of relative movement to an extent dependant upon the charge levels on the drops and drop intercepting means for collecting drops other than those drops charged for printing on the printing surface, the drops charded for printing in the printing guns during each period of the voltage waveform being deposited in respective line sections formed by contiguous drops which sections together present a printed line transversely of the direction of relative movement, the printed lines being formed in contiguity successively at the frequency of the voltage waveform applied to the charge electrode means and there being a predetermined relationship between the rate of deposition of printing lines and the printing surface speed.

It is an object of the present invention to provide an improved form of ink jet array printer of the kind set forth.

The present invention consists in an ink jet array printer of the kind set forth which is characterised in that there are provided for each printing gun detector means which sense values representative of drop placement errors of jets of test drops in the direction of relative motion of the printing surface and the printer and control means responsive to the values sensed by the detector means of each printing gun which are operative to advance or retard the application to the charge electrode means of the corresponding printing gun of the periodic voltage waveform thereby to correct for drop placement errors in the direction of relative movement of the printing surface and the printer.

Preferably, the detector means of each printing gun comprises pairs of conductive, strip-like surfaces extending transversely of the direction of relative motion of the printing surface and the printer and adjacent the flight path of the streams of drops formed in the printing gun, whereby test jets of charged drops in the printing gun are employed to induce voltages in the conductive strip-like surfaces which afford a measure of the position of the drops in said direction of relative movement and the control means are responsive to said induced voltages to derive correction voltages to advance or retard the application to the charge electrode means of the corresponding printing gun of the periodic voltage waveform.

Suitably, the conductive strip-like surfaces are provided by edge surfaces of respective electrode plates of the detector means. p Advantageously, the electrode plates are formed on opposite sides thereof with respective layers of insulation and on the sides of the layers of insulation remote from the electrode plates with respective layers of conductive material which screen the electrode plates from electrical noise.

In one form, the printer is a sheet fed printer and the pairs of strip-like surfaces of the respective printing guns are disposed below the printing surface and extend transversely to said direction of relative movement to the end that test jets from the respective printing guns each pass between the strip-like surfaces of the associated pair of such surfaces to induce voltages thereon and the control means are responsive to said induced voltage to derive the correction voltages.

In another form the printer is a sheet or web fed printer and the pairs of strip-like surfaces are disposed above the printing surface and extend transversely to said direction of relative movement and opposite an earthed block, to the end that jets of test drops of each printing gun pass between the sensing elements and the earthed block respectively to induce voltages on corresponding pairs of the strip-like sensing surfaces and the control means are responsive to the induced voltages to derive the correction voltages.

In a further form of the invention the control means includes means for ensuring that a print position on the printing surface arrives at a printing position in the printer coincidentally with the arrival at the printing surface of drops charged for printing at the print position on the printing surface.

Figure 2:
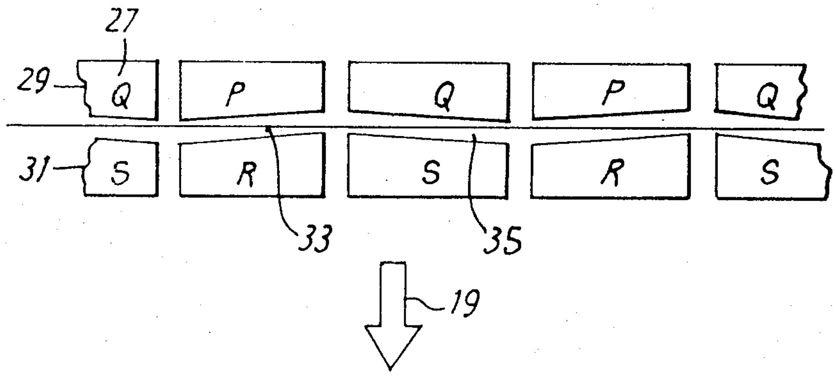
Figure 3:
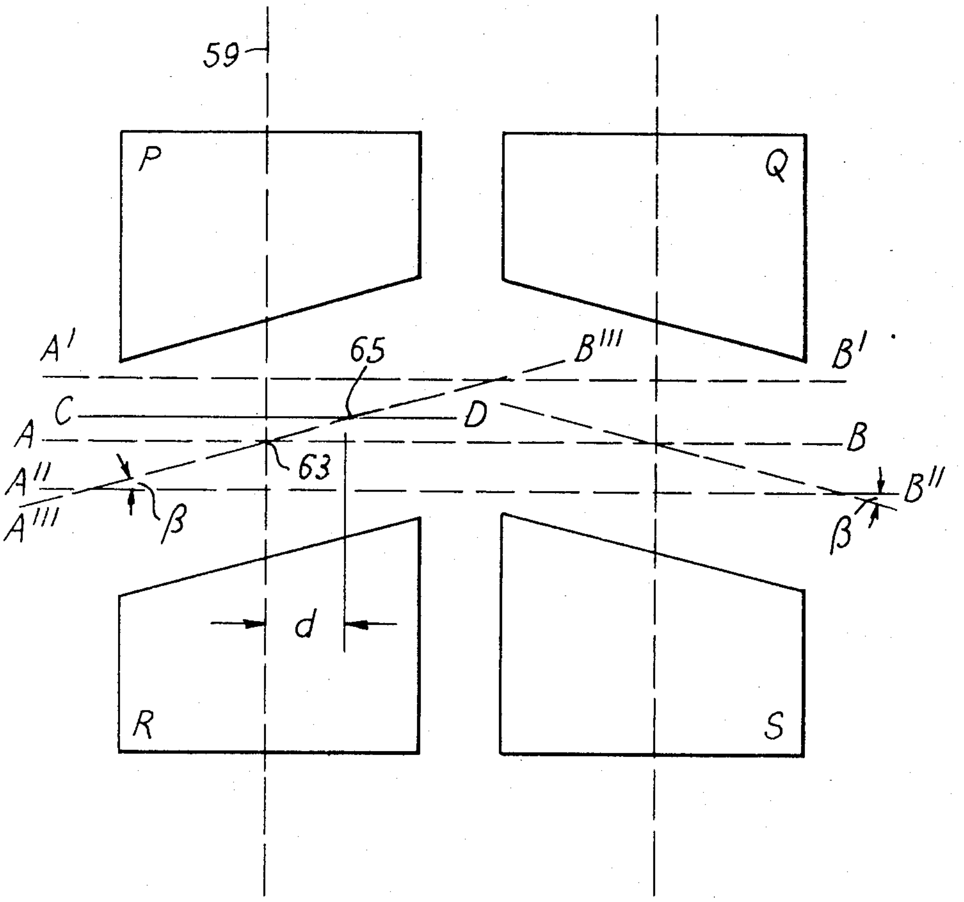
Figure 4:
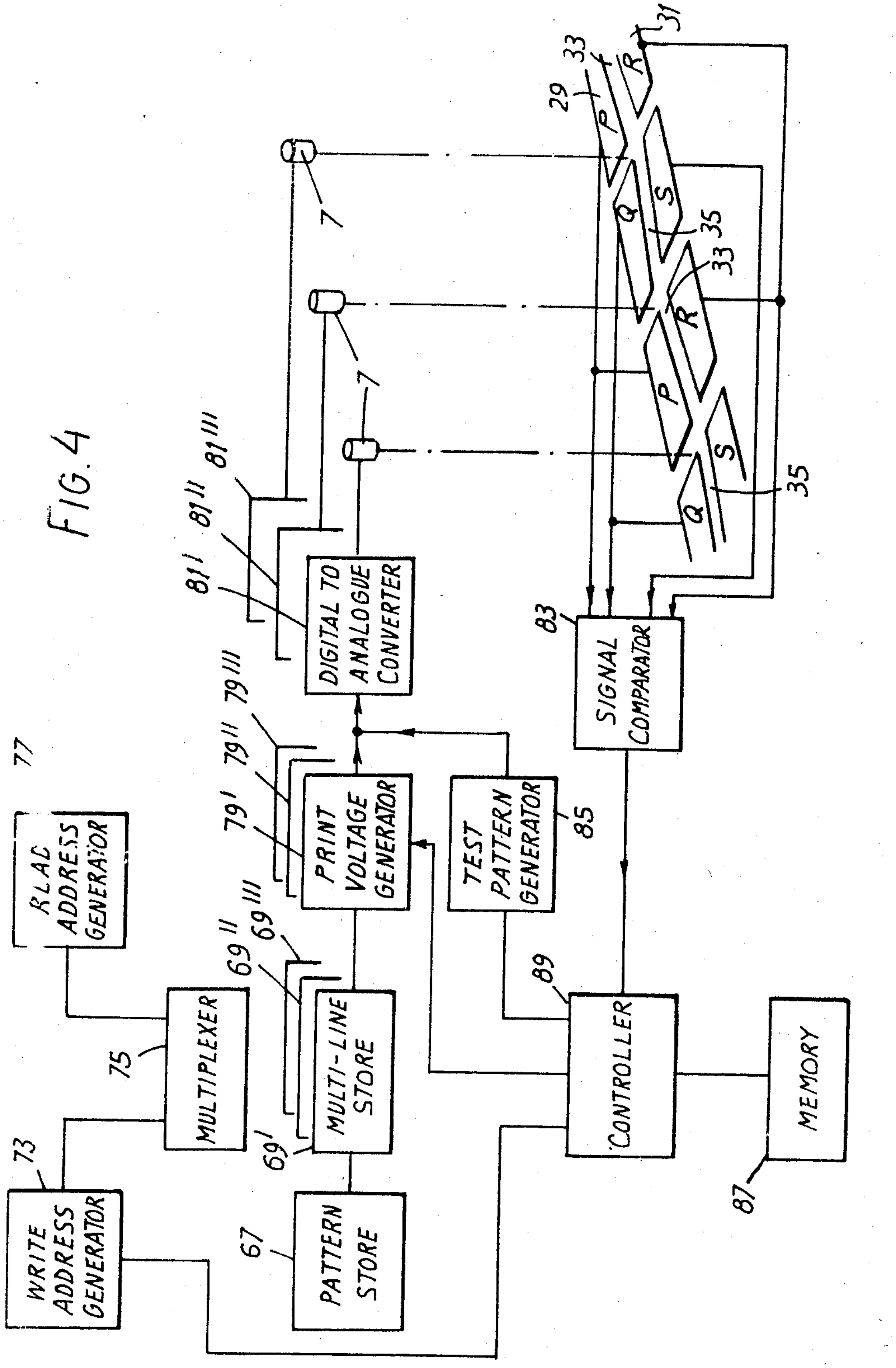
Figure 5:
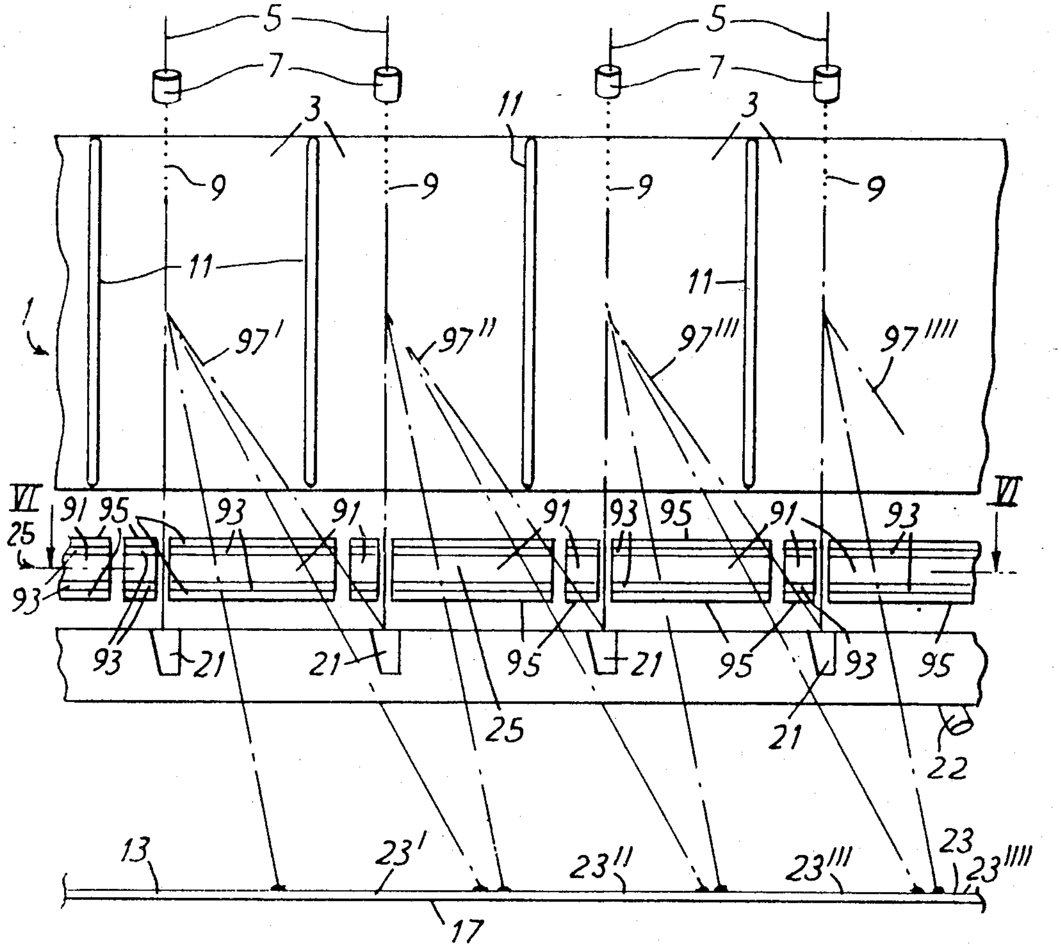
Figure 6:
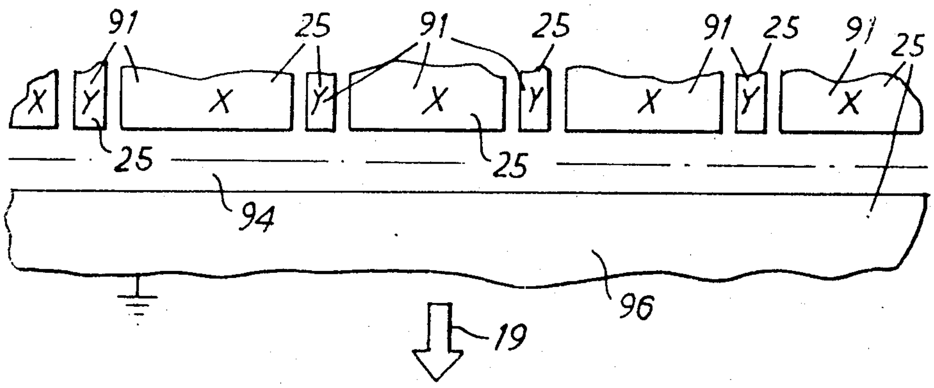
Figure 7:
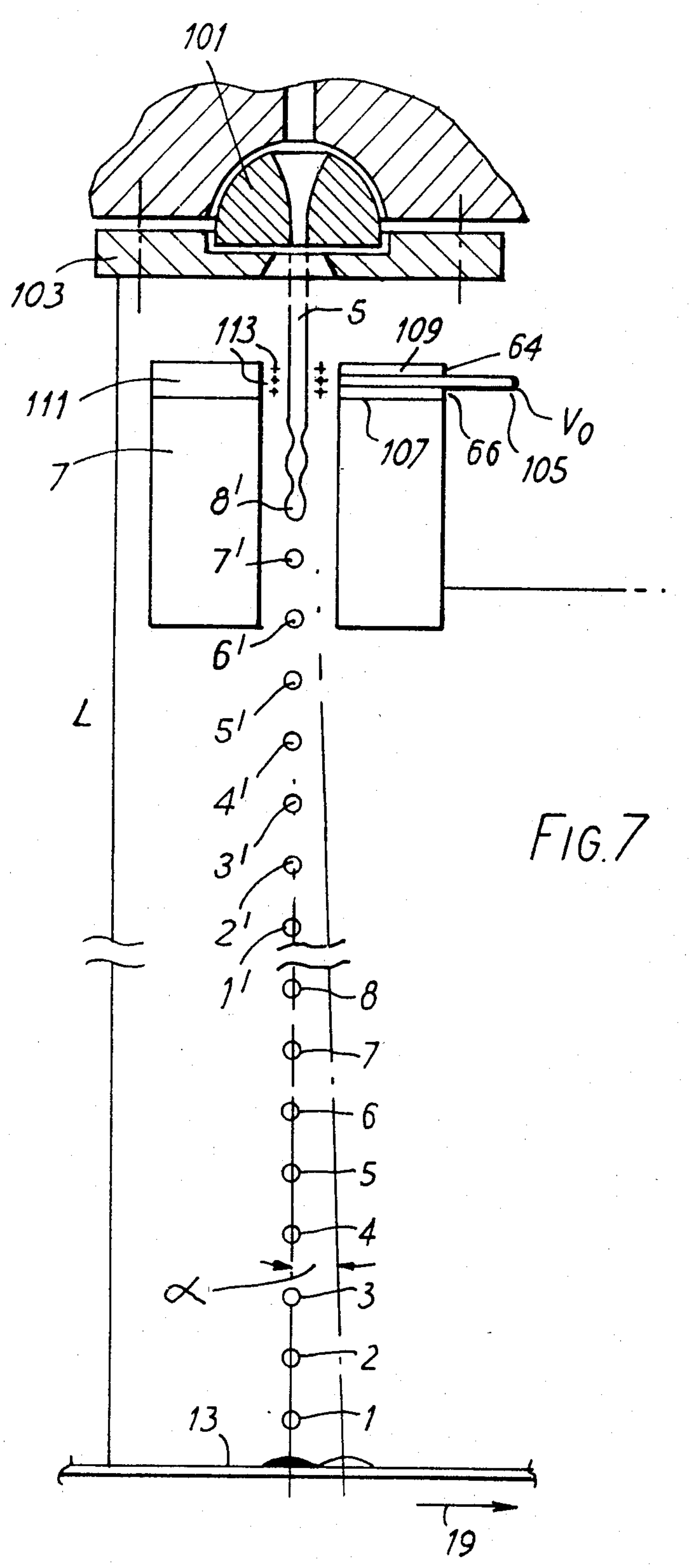
Figure 10A:
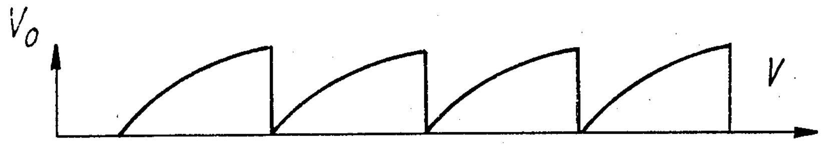
Figure 10B:
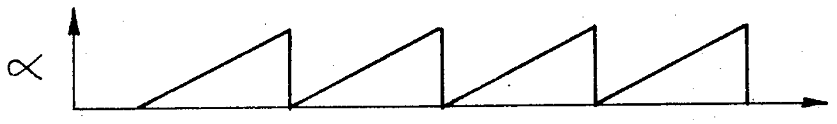
Figure 10C:
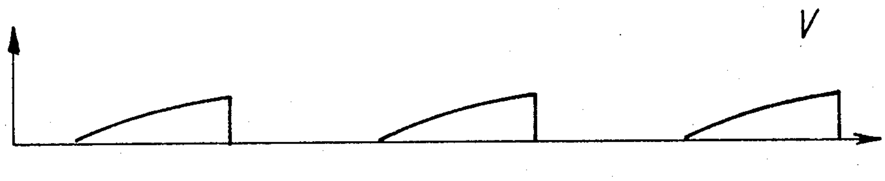

The invention will now be described by way of example, with reference to the accompanying drawings, in which:

FIG. 1 is a somewhat diagrammatic fragmentary elevation to an enlarged scale and partly in section, of a sheet fed, ink jet array printer according to the invention, FIG. 2 is a diagrammatic sectional plan view taken approximately at the level II—II of FIG. 1 illustrating certain details only of the printer of FIG. 1, FIG. 3 is an enlarged view of part of FIG. 2, FIG. 4 is a block diagram of electronic circuitry controlling the operation of the printer of FIGS. 1 and 2, FIG. 5 is a view similar to FIG. 1 showing a web fed ink jet array printer according to the invention, FIG. 6 is a somewhat diagrammatic plan view taken approximately at the level VI—VI of FIG. 5 illustrating certain details only of the printer of FIG. 5, FIG. 7 is a side elevation in the longitudinal direction of a further embodiment of ink jet array printer, according to the invention, which may be either sheet or web fed, FIG. 8 is a diagram illustrating the relative positions in flight of two rasters of printed drops in the printer of FIG. 7, FIG. 9 is a diagram illustrating the printed positions of the drops in the rasters of FIG. 8, and FIGS. 10 *a, b* and *c* are graphs illustrating characteristics of the operation of the printer of FIG. 7.

In the drawings like parts have been accorded the same reference numerals.

Referring first to FIGS. 1 to 3, an ink jet array printer 1 comprises a row of printing guns 3 which each have means for supplying ink under pressure to an orifice (not shown) from which the ink issues as a (downwardly) stream 5 which at the level of charge electrodes 7 breaks up in to regularly spaced drops 9. The charge electrodes 7 are supplied under the control of printing information with a periodic waveform comprising one or more sequences of different voltage levels representative of printing information. The period of the waveform spans the formation of a series or rasters of consecutively charged drops as determined by the voltage levels prevailing at the charge electrodes 7 as the drops separate in the streams 5. The drops 9 after charging descend between a pair of deflection plates 11 where they are subjected to a constant electrostatic field transverse to the direction of movement of a printing surface 13 in which the drops are deflected to an extent dependent upon the levels of charge which they carry. The drops charged for printing are deposited on the printing surface 13 which in the case of the printer of FIGS. 1 to 4 is that of a sheet 15 of a sheet fed machine, whilst, in the case of the printer of FIGS. 5 and 6, the surface 13 is that of a web 17 of a web fed machine. The arrow 19 indicates the direction of motion of the printer surface 13 through the printer.

Between the deflection plates 11 and the printing surface 13 is located a transversely extending row of drop interception gutters 21 in which are collected unprinted drops. Unprinted drops may be uncharged drops which arise on start up or shut down of the printer. These are deposited in the gutter 21 immediately below the charge electrode 7 through which they pass. Drops in the printing rasters which are not intended for printing are given a predetermined charge which deflects them to the gutter 21 below the corresponding charging electrodes. The drops collected in the gutters 21 are recirculated through a pipe 22 which extends from the body of the gutters.

The printing raster drops which are charged for printing are deposited at print position in line sections 23′ 23″ 23‴ and 23⁗ of a printed line 23 (in the plane of FIG. 1 and FIG. 5), such lines being printed at the frequency of the voltage waveform applied to the charge electrodes 7. The drops charged for printing form spots on the printing surface and spots in adjacent print positions in the line sections and the print lines are contiguous and need to be printed to within a tolerance, typically, of one quarter of a spot pitch in order to present acceptable printing quality.

A variety of factors affect the accuracy of drop placement both in and transverse to the direction of printing surface movement through the printer. The control of drop placement position in the direction transverse to that of printing surface motion is discussed in our copending application Ser. No. 246,222. Here concern is confined to the control of drop placement position in the direction of motion of the printing surface.

A first cause of error in drop placement position in the direction of motion of the printing surface arises from differences in times of flight of drops 9 formed in adjacent streams 5 as they descend from the charge electrodes 7 to the printing surface 13. Such differences normally are negligible in array printers and are in the present instance ignored.

A second cause of error stems from the fact that the flight paths of adjacent jets, which should be in the plane containing the streams 5 may be displaced angularly in the direction of travel of the surface 13. Typically the tolerance for such angular displacement is 1 in 2000 and as it is found that the angle of flight can vary outside this tolerance, control is required to compensate for the effect of mis-alignment of each jet on the drop placement position along the printing surface.

A third cause of drop placement error in the direction of motion of the printing surfaces arises from the period of the voltage waveform, which causes certain drops to be formed and printed in the raster earlier than others. Due to the finite movement of the printing surface in this period each line section incurs a spead in the said direction.

A fourth cause of error is attributable to the variation in the velocity of the printing surface 13 in some array printers. If the printing surface is moving at a constant velocity the print lines successively deposited are evenly spaced. If the velocity varies, however there will be variation in the printing spacing which degrades the quality of printing. The spacing of successive print lines accordingly requires to be under control.

In the embodiments of FIGS. 1 to 6 the control of jet alignment is effected in a generally similar manner. In each case detectors 25 are provided for each printing gun which serves to detect, during test performed at frequent intervals, the displacement (at a particular level) of the individual jets in the direction of travel of the surface 13. The detectors 25 are also used to measure errors of drop placement in the transverse direction such measurements being described in copending application Ser. No. 246,222. As the machine of FIGS. 1 to 3 is a sheet fed machine the detectors 25 can conveniently be located below the level of the printing location sheet 15 and tests are conducted in intervals between printing of successive sheets. In the machine of FIGS. 5 to 6, however the machine is web fed and the detectors 25 are located above the level of the web 17.

Considering first the sheet fed printer of FIGS. 1 to 4, the detector 25 comprises a five layered sandwich of which the middle layer 27 consists of two rows of induced charge detector electrodes 29, 31, row 29 of which comprises alternating electrodes P and Q whilst row 31 comprises alternating electrodes R and S. The electrodes P are spaced from electrodes Q by constant spacings and are spaced from the electrodes R by a gap 33 which is inclined with respect to the direction transverse to the direction of travel of the print surface 13 by an angle $\beta$. Similarly the electrodes Q and S are spaced by a gap 35 equal to magnitude in the direction of travel of the surface 13 to the gap 33 and inclined to the direction transverse to the direction of travel by the same angle $\beta$, the gaps 33 and 35 however being inclined in opposite senses to the direction of travel.

On opposite sides of the electrodes P, Q, R and S are respective insulating layers 37 which on the sides thereof remote from the electrodes P, Q, R and S are covered by respective earthed conductive layers 39 which serve to screen the electrodes P, Q, R and S from electrical noise. Below the detectors 25 is located a drop collection gutter 41 which collects drops which during the jet alignment tests pass, as hereinafter described, between the pairs P, R and Q, S of detector electrodes.

As seen in FIG. 1 the jets 47′ and 45″ deposit contiguous drops 57′ and 55″ during printing on the surface 13. Likewise the jets 47″ and 45‴ deposit contiguous drops 57″ and 55‴ whilst the jets 47‴ and 45⁗ deposit contiguous drops 57‴ and 55⁗. The contiguous drops formed by adjacent printing guns on the surface 13 define the ends of print line sections 23′, 23″, 23‴ and 23⁗ which together form the print line 23. The electrodes P, Q, R and S are located in the plane in which contiguous drops from adjacent guns, e.g. drops 57′, 55″ or 57″, 55‴, in the absence of the sheet 15 become coincident.

In the course of the jet alignment tests, the groups of test drops jets 43′ to 43⁗ are tested one at a time. Each jet is charged by a voltage pattern produced by a test pattern generator 61 (see FIG. 4) which causes a series of drops from the printing gun concerned to pass through a particular point on the plane the electrodes P, Q, R and S between the pair of electrodes, as the case may be, P, R or Q, S.

As shown in FIG. 3 line A–B passes midway between the rows 29 and 31 of electrodes P, Q and R, S. This line lies in the vertical plane containing the jet streams 5 that is to say the position of the streams for zero jet misalignment. The line A′, B′ and A″, B″ indicate jet misalignment respectively rearwardly and forwardly in the direction of printing surface travel. It will be appreciated that misalignment of adjacent jets may well and in practice does differ.

During an interval between delivery of sheets 15 each printing gun is subject to a test carried out with a jet in a deflected position such as jet 43′, 43″, 43‴, 43⁗ of drops 9. The chosen jets lie between jets which are the least deflected jets 45′, 45″, 45‴, 45⁗ and the most deflected jets 47′, 47″, 47‴, 47⁗ of the printing guns and a group of test drops is used in each test jet. In the case where there is zero misalignment error in the direction of travel of the surface 13, the chosen jets 43′ to 43⁗ each intersect the line A–B.

The case when there is no transverse misalignment error (measured as described in in co-pending application Ser. No. 246,222) is first described. Suppose the jet being tested descends between a pair of the electrodes P and R. As charged drops pass between the electrodes, signals are induced on the electrodes P and R, and the test voltage which deflects the test jet through the null point 63 is sought. This is the jet which passes through the intersection of the line A–B, which is the locus of a deflected jet with zero misalignment, and the line A″′–B‴, which bisects the gap 33 between P and R and is therefore the locus of jets which induce equal potentials on the electrodes P and R. The test voltage corresponding to the null point 63 is found by an iterative procedure, as will be described, and the corresponding voltage is stored in a memory.

In the case when there is a misalignment error of the jet in the transverse direction but not in the direction of motion of the surface B, although the locus of the jet during test is still A–B, the test voltage corresponding to the null point is different. However an offset voltage can be calculated from the transverse correction voltage (measured as in the co-pending application Ser. No. 246,222) as described a linear interpolation of the correction voltages obtained. When the null test voltage is corrected by the offset voltage, the null voltage, corresponding to the null location, stored in the memory is unaltered.

When the measurements are made on a jet which has a misalignment error in the direction of printing surface motion, its deflection locus can be described by a line such as C–D. Following the iterative test procedure, the test voltage corresponding to the null voltage now occurs when the jet passes through 65, this being the intersection of the locus C–D with the equipotential locus A‴–B‴ between the detection plates P and R.

The null voltage, corrected by the offset voltage (which compensates transverse misalignment) is now stored in the memory. This voltage corresponds when printing to a print location aligned with point 65, which is at distance d from the line 59 which is the longitudinal bisector of the detectors P and R. The mislaignment can be seen to be d tan $\beta$. In the present embodiment of a fixed speed printer the error $\pm$d tan $\beta$ in the direction of print surface motion is compensated by advancing or delaying charging by a corresponding number of drops.

Referring now to FIG. 4, during printing, pattern data indicating print/no print information for each printing gun, is fed from pattern store 67 to multiline stores 69′, 69″ etc. into the single bit locations specified by the Write Address Generator 73 fed by multiplexer 75. The Write Address Generator 73 serves the dual purpose of re-arranging the pattern data into groups so that the data is stored in approximate drop charging order and it also allows a variable delay to be introduced in the printing of the pattern by varying the separation between write addresses and read addresses, as generated by the Read Address Generator 77. Data from the multiline stores is fed to print voltage generators 79′, 79″, 79‴ in which the voltages to be applied to the respective charge electrodes in the different printing guns are generated. These voltages are fed to the appropriate digital to analogue convertors 81′, 81″, 81‴ which apply the drop charging voltages to the correspondng charge electrodes.

The iterative test procedure is then brought into operation in periods between sheet delivery and the voltages induced on the electrode pair, P, R are compared in signal comparator 83. This is accomplished by subjecting the jet 43′ to a voltage pattern supplied from Test Pattern Generator 85 to charge electrode 7. If the signal on electrode R is greater than that on electrode P, the test is repeated with a pattern of slightly lower voltages from the Test Pattern Generator. If the signal on electrode R remains higher than that on electrode P, the test is again repeated with a still lower voltage pattern from the Test Pattern Generator. The procedure is repeated until the point is reached where the signal on electrode R is less than that on electrode P. A value representing the least voltage to produce that deflection, corrected by the offset voltage calculated from the transverse correction voltages, is stored in the memory 87. A similar procedure with a pattern of higher voltages is carried out if initially the voltage on electrode P is higher than that on electrode R.

In subsequent periods between sheet delivery the same test is carried out for each printing gun in turn. A value corresponding to the voltage at the null point of each of the jets 5 is stored at separate locations in the memory 87. Having thus calculated and stored the jet alignment errors in the direction of travel of the surface 13, the printing errors which would otherwise result are removed by delaying or advancing the drop charging sequence appropriately for each of the jets 5. The write address generator accomplishes this task under the control of controller 89 which accesses the memory 87. The controller 89 in accordance with the errors stored in the memory 87 changes the separation between write addresses and read addresses as generated by the Read Address Generator 77. The delay thus established determines the time of commencement of the charging of drops in each of the charging electrodes 7. The delay can be adjusted in steps down to a single drop period.

Referring now to FIGS. 5 and 6, a web fed printer is illustrated in which the test drops are collected in gutters 21 located above the surface 13. The detectors 25 are again made of central detector electrodes 91 designated X and Y between layers 93 of insulation, the latter being covered by conductive earthed layers 95 which screen the electrodes 91 from electrical noise. Opposite the electrodes 91 and spaced therefrom by a straight sided gap 94 is an earthed block 95. The gutters 21 lie vertically below the gap 94.

The detectors 25 are used both for transverse deflection correction, as described in copending application Ser. No. 246,222, and for correction in the direction of motion of the web 17 which is the present concern. Testing to evaluate the magnitude of this latter correction takes place during intervals between printing. Jets 97′ 97″ 97‴ in the printing guns are employed for the tests which take place on one gun at a time. The jets 97′ 97″ and 97‴ are directed to the gutter 21 of the respective adjacent printing guns and charged drops in their paths each induce voltages on a pair of the electrodes X and Y the magnitudes of which depend on the distance from the electrodes of the charged drops. The closer the charged drops of jets 97′ 97″ 97‴ pass to the corresponding electrodes X and Y the larger the voltages induced. The voltage levels on the electrodes X and Y are summed and then measured in a voltage measuring unit which replaces the comparator 83 in FIG. 4. The voltages thus measured for each printing gun by the voltage measuring unit are stored in the memory 87 and are used to control the separation of the write and read addresses, as described for the embodiment of FIGS. 1 and 4, to advance or retard the application to the electrodes 7 of the drop charging waveforms. The arrangement described for jet alignment correction in the web fed printer of FIGS. 5 and 6 would also be applicable to a sheet fed printer.

Referring now to FIGS. 7 to 10; in the embodiment herein illustrated ink jet stream 5 is directed through charge electrode 7 to the printing surface 13 which is moving in the direction of arrow 19. In the electrode 7 the stream breaks up into drops 9 which are charged in accordance with the voltage levels prevailing at the time of drop formation on the drop charging voltage waveform. Between the charge electrode 7 and the print surface 13 the drops 9 fall through the electrostatic field of the deflection plates 11 (not shown in these views). The drops 9 which are charged fan out transversely under the influence of the electrostatic field. Two rasters each of eight drops numbered 1 to 8 and 1′ to 8′ are illustrated when the printer operates at maximum printing speed and the drops are deposited in the two line sections being spread in the direction 19 as illustrated in FIGS. 8 and 9. The drop formation order and the corresponding print positions are given in the following table.

| | | | | | | | | | | | |
|---|---|---|---|---|---|---|---|---|---|---|---|
| Drop Formation Order | 1 | 2 | 3 | 4 | 5 | 6 | 7 | 8 | 1′ | 2′ | 3′ etc |
| Drop Print Position | 2 | 6 | 4 | 8 | 1 | 5 | 3 | 7 | 2 | 6 | 4 etc |

The maximum spread E of drops between the first blast drops printed in each raster is given by $E=V_{MAX}\theta$ where $V_{MAX}$ is the maximum velocity of the printing surface 13 and $\theta$ is the period of the voltage waveform spanning each raster of drops.

If the spread of each line section is not within acceptable tolerance this means that E is too great. E can be reduced, since $\theta$ is usually a constant by reducing the printing velocity, which necessitates introducing unprinted drops between each printed raster. If however one wishes to maintain the maximum speed of printing, recourse must be made to other methods. Thus if the jet 5 is progressively deflected in the period $\theta$ by an angle $\alpha$ where $(L\alpha/\theta)=V_{MAX}$ and if the jet is then restored to $\alpha=0$ before the start of the next waveform, the printed drops will fall on the surface 13 so E-0. It will be noted that L is the distance which the jet 5 falls to the surface 13 from nozzle 101 which is vertically aligned by rocker plate 103. An angle $\alpha$ typically of three to four milliradians is required to achieve this at maximum printing speed, this value of angle $\alpha$ being reduced for lower speeds. In practice the tolerance required of angle $\alpha$ is not very great if a print tolerance of a quarter of a drop pitch (approximately equal to E/4) is to be maintained.

To deflect the jet 5 by the angle $\alpha$, an electrode 105 is located above the charge electrode 7 that is to say, on the side of the electrode 7 remote from the printing surface 13. The electrode 105 is shown as mounted on the electrode 7 between layers 107 and 109 of insulation, a further layer 111 of insulation being located opposite the electrode 105 and layers 107 and 109. The electrode 107 may alternatively be mounted on the plate 103.

When a voltage Vo is applied to the jet stream 5 a stationary charge ring 113 is induced on the jet of opposite sign to the applied voltage Vo as the ink flows past. The jet 5 is drawn to the electrode 105 and the resulting angle of the jet is a function of the applied voltage Vo.

In operation a voltage waveform of generally saw tooth shape spanning the period $\theta$ of the raster drop charging waveform is applied to electrode 105. The waveform is synchronised with the drop charging waveform. By increasing $\alpha$ linearly throughout the period $\theta$ the drops follow a flight path which compensates for the motion of the surface 13 and are deposited on a line section with reduced or zero spread E. FIG. 10(*a*) shows the voltage waveform at maximum speed required to produce linear increase of the angle $\alpha$ in each period $\theta$ as shown in FIG. 10(*b*). The voltage waveform is as will be seen non-linear. At lower velocity, such as half speed as shown in FIG. 10(*c*), the voltage amplitude required is smaller and this is in proportion to the reduction of angle $\alpha$ resulting from the speed reduction.

For an array printer the same voltage Vo can be applied to all the jets 5 and a correction dependent upon print speed is simultaneously applied to the jets of all the printing guns.

The method of correction to reduce the spread E in the direction of motion of the surface 13 can be applied to reduce the alignment error for the embodiments of FIGS. 1 to 6. In this event the error of position of each jet relative to the transverse print datum A–B is detected and a D.C. voltage which is different for each jet is added to the voltage Vo to equalise the location of the jet 5 relative to the line A–B.

A further error to which ink jet printers are prone is in the location of the printed line sections in the direction of travel of the surface 13 when the speed of the paper feed varies. This error arises from the variable extent of paper motion in the period of drop flight between charging and printing. If the paper speed increases the drop charging waveforms at the electrodes 7 are correspondingly advanced and if the paper speed falls the drop charging waveforms are delayed.

If the instantaneous printing velocity and acceleration are $\dot{x}$ meters/second and $\ddot{x}$ meters/second/second, all the printed lines needs to be advanced by $$\dot{x}\,T + \frac{\ddot{x}\,T^2}{2}$$

where T=the time of flight of drops from the charge electrodes 7 to the printed surface 13. The second term of the above expression $$\frac{\ddot{x}\,T^2}{2}$$

is usually negligible and can be ignored. This is best achieved by varying the timing of the transfer of data from the pattern store 41 as all printing guns are equally affected and the delay is substantial at low speeds.

The first printing location on the paper is sensed at a distance at least $\dot{x}_{MAX}T$ where ($\dot{x}_{MAX}$ is the maximum paper speed) ahead of the print position in the printer (i.e. the line intersection of the plane of the paper and of the jets 5). Photoelectric means or a shaft encoder in the paper feed may suitably be employed for this purpose. Immediately prior to this measurement the time interval between print lines, so called "strokes", is measured by the controller 89 and converted into an integral number of stroke periods in the time T either by division or preferably by searching through a read only memory. This integral number is subtracted from the number of strokes in the distance $\dot{x}_{MAX}T$. The resulting number is reduced by unity each time a stroke pulse is received by the controller 89 and when the number is decremented to zero, the controller starts extracting data from the pattern store 67 and drop charging starts.

It will be apparent that when the number has been decremented to zero the print location on the paper lags the print position in the printer by the number of strokes equal to the number of rasters of drops which during printing are in flight i.e. the number of rasters generated in the time T. Thus the first raster reaches the printing surface 13 as the printing location on the paper reaches the printing position in the printer. In a variable speed printer the start of every voltage waveform applied to the charge electrodes 7 is maintained ahead of the arrival of the corresponding print location at the print position in accordance with the instantaneous printing surface velocity.

We claim:

1. An ink jet array printer adapted to print by depositing small drops of ink in accordance with printing information on a surface to be printed during unidirectional movement relatively to the printer, of the printing surface, comprising one or more rectilinear rows of ink jet printing guns, each gun having (a) means for supplying printing ink under pressure to an orifice, (b) means for forming regularly spaced drops in the ink stream issuing from the orifice, (c) charge electrode means for imparting charge levels to drops in the stream, (d) means for applying to the charge electrode means, under the control of the printing information, a periodic voltage waveform whose period is sufficient to span the formation of a series, hereinafter referred to as a "raster", of consecutively formed drops and whose amplitude is dependent on said printing information and determines said charge levels imparted to drops in the ink stream, (e) drop deflection means for providing a substantially constant electrostatic field through which the drops pass towards the printing surface and for causing deflection of electrically charged drops, transversely to the direction of relative movement of the printing surface and the printer, to an extent dependent upon the charge levels on the drops, and (f) drop intercepting means for collecting drops other than those drops charged for printing on the printing surface, the drops charged for printing in the printing guns during each period of the voltage waveform being deposited in respective line sections formed by contiguous drops, which sections together present a printed line transversely of the direction of relative movement, the printed lines being formed in contiguity successively at the frequency of the voltage waveform applied to the charge electrode means, the improvement whereby nozzle-associated drop placement errors in the direction of relative movement of the printing surface and the printer are corrected, wherein the printer further includes:

a plurality of detector means, one said detector means associated with each printing gun, for electrically sensing the position of jets of charged test drops from said associated printing gun, thereby to provide values representative of drop placement errors in the direction of relative motion of the printing surface and the printer of drops printed by said associated printing gun, and controls means responsive to said values provided by said detector means of each printing gun for advancing or retarding, in dependence upon said values, the application to the charge electrode means of the corresponding printing gun of the periodic voltage waveform, thereby to correct for drop placement errors in the direction of relative movement of the printing surface and the printer, as measured by the positions of the jets of charged test drops sensed by the detector means.

2. A printer as claimed in claim 1, characterised in that the control means include between each charge electrode and jet forming nozzle, a deflection electrode and means are provided for applying to said deflection electrode in synchronism with the drop charging voltage waveform applied to the charge electrode a generally sawtooth voltage which during each period of the drop charging voltage waveform progressively deflects the jet in a direction as to reduce the spread, in the direction of relative motion between the printing surface and the printer, of drops deposited in the corresponding line section.

3. A printer as claimed in claim 2, characterised in that each deflection electrode is mounted between insulating layers on such corresponding charge electrode.

4. A printer as claimed in claim 3, characterised in that means are provided for adding a d.c. voltage which is different for each jet to the sawtooth voltage applied to each deflection electrode which is adapted to correct the jet for misalignment thereof in the direction of relative motion of the printing surface and the printer.

5. A printer as claimed in claim 3 or 4, characterised in that each deflection electrode is mounted on the mounting of the corresponding nozzle.

6. A printer as claimed in claim 1, wherein the detector means of each printing gun comprise pairs of conductive, strip-like surfaces extending transversely of the direction of relative motion of the printing surface and the printer and adjacent the flight path of the streams of drops formed in the printing gun, whereby test jets of charged drops in the printing gun are employed to induce voltages in the conductive strip-like surfaces which afford a measure of the position of the drops in said direction of relative movement and the control means are responsive to said induced voltages to derive correction voltages to advance or retard the application to the charge electrode means of the corresponding printing gun of the periodic voltage waveform.

7. A printer as claimed in claim 6, wherein the conductive strip-like surfaces are provided by edge surfaces of respective electrode plates of the detector means.

8. A printer as claimed in claim 7, wherein the electrode plates are formed on opposite sides thereof with respective layers of insulation and on the sides of the layers of insulation remote from the electrode plates with respective layers of conductive material which screen the electrode plates from electrical noise.

9. A printer as claimed in claim 6, in which the printer is a sheet fed printer, wherein the pairs of strip-like surfaces of the respective printing guns are disposed below the printing surface and extend transversely to said direction of relative movement to the end that test jets from the respective printing guns each pass between the strip-like surfaces of the associated pair of such surfaces to induce voltages thereon and the control means are responsive to said induced voltages to derive the correction voltages.

10. A printer as claimed in claim 9, wherein each test jet has applied to the drops thereof a voltage to deflect the jet in the direction of a location substantially spaced from the ends of the line section printed on the printing surface by the corresponding printing gun.

11. A printer as claimed in claim 6, and in which the printer is a sheet or web fed printer, wherein the pairs of strip-like surfaces are disposed above the printing surface and extend transversely to said direction of relative movement and opposite an earthed block, to the end that jets of test drops of each printing gun pass between the sensing elements and the earthed block respectively to induce voltages on corresponding pairs of the strip-like sensing surfaces and the control means are responsive to the induced voltages to derive the correction voltages.

* * * * *